United States Patent
Nojiri et al.

(10) Patent No.: US 9,849,986 B2
(45) Date of Patent: Dec. 26, 2017

(54) AIRCRAFT GALLEY UNIT

(71) Applicant: JAMCO CORPORATION, Mitaka-shi, Tokyo (JP)

(72) Inventors: Kenji Nojiri, Mitaka (JP); Yoshihisa Tsutsui, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 15/513,667

(22) PCT Filed: Sep. 24, 2014

(86) PCT No.: PCT/JP2014/075185
§ 371 (c)(1),
(2) Date: Mar. 23, 2017

(87) PCT Pub. No.: WO2016/046899
PCT Pub. Date: Mar. 31, 2016

(65) Prior Publication Data
US 2017/0305554 A1     Oct. 26, 2017

(51) Int. Cl.
*B64D 11/04* (2006.01)

(52) U.S. Cl.
CPC .................. *B64D 11/04* (2013.01)

(58) Field of Classification Search
CPC ....................................... B64D 11/04
USPC ....................................... 244/118.5
See application file for complete search history.

(56) References Cited

U.S. PATENT DOCUMENTS

| | | | |
|---|---|---|---|
| RE32,176 E * | 6/1986 | Vernon ................. | A47B 77/02 186/40 |
| 6,761,332 B1 | 7/2004 | Bengtsson | |
| 8,136,762 B2 * | 3/2012 | Gauggel .................. | B64C 1/40 244/118.5 |
| 9,403,603 B2 * | 8/2016 | Hozumi ............. | B64D 11/0007 |
| 9,422,056 B2 * | 8/2016 | Ehlers .................... | B64D 11/02 |
| 2001/0050519 A1 | 12/2001 | Kasuya | |
| 2005/0133308 A1 | 6/2005 | Reysa et al. | |
| 2007/0018046 A1 | 1/2007 | Boren | |
| 2007/0108346 A1 | 5/2007 | Zwaan | |
| 2007/0283819 A1 | 12/2007 | Baatz | |
| 2009/0283636 A1 | 11/2009 | Saint-Jalmes et al. | |
| 2009/0289146 A1 | 11/2009 | Gauggel et al. | |

(Continued)

FOREIGN PATENT DOCUMENTS

| | | | |
|---|---|---|---|
| DE | 2103781 A | 8/1972 | |
| DE | 29500398 U1 | 3/1995 | |

(Continued)

OTHER PUBLICATIONS

International Search Report dated Dec. 16, 2014, issued in counterpart International Application No. PCT/JP2014/075185, w/English translation. (5 pages).

(Continued)

*Primary Examiner* — Brian M O'Hara
*Assistant Examiner* — Keith L Dixon
(74) *Attorney, Agent, or Firm* — Westerman, Hattori, Daniels & Adrian, LLP

(57) ABSTRACT

An aircraft galley unit including a floor-side unit comprising a table provided on an upper face and a storage section provided in a side portion thereof. An entire outer periphery of the floor-side unit is surrounded by aisles.

4 Claims, 2 Drawing Sheets

(56) References Cited

U.S. PATENT DOCUMENTS

| | | | |
|---|---|---|---|
| 2010/0219292 | A1 | 9/2010 | Saint-Jalmes et al. |
| 2010/0243801 | A1 | 9/2010 | Saint-Jalmes et al. |
| 2012/0032026 | A1 | 2/2012 | Becker et al. |
| 2013/0256249 | A1 | 10/2013 | Burd |

FOREIGN PATENT DOCUMENTS

| | | |
|---|---|---|
| JP | 2001-199399 A | 7/2001 |
| JP | 2006-516512 A | 7/2006 |
| JP | 2009-522148 A | 6/2009 |
| JP | 2012-517381 A | 8/2012 |
| WO | 2007/096000 A1 | 8/2007 |

OTHER PUBLICATIONS

Written Opinion dated Dec. 16, 2014, issued in counterpart International Application No. PCT/JP2014/075185, w/English translation. (10 pages).

Notification of Reasons for Refusal dated Apr. 5, 2016, issued in counterpart Japanese Patent Application No. 2015-524526, w/English translation. (6 pages).

Decision of Refusal dated Oct. 4, 2016, issued in counterpart Japanese Patent Application No. 2015-524526, w/English translation. (5 pages).

Decision to Grant a Patent dated Feb. 14, 2017, issued in counterpart Japanese Patent Application No. 2015-524526, w/English translation. (6 pages).

Office Action dated Aug. 2, 2017, issued in counterpart German Application No. 112014006981.7, with English translation. (14 pages).

\* cited by examiner

AIRCRAFT GALLEY UNIT

TECHNICAL FIELD

The present invention relates to a configuration of a galley (kitchen) unit installed in a passenger aircraft.

BACKGROUND ART

Regarding aircraft galley units installed in passenger aircrafts, there are demands to reduce the space of the galley unit with the aim to increase the number of seats to allow the number of passengers to be increased, or to ensure wider distance between the seats in consideration of the ride quality of the passengers.

On the other hand, during long flights such as international flights, there are cases where the passengers leave their seats to go to lavatories and the like. Further, a certain load is imposed on the passengers if they continue to be seated with their seat belts fastened for a long time.

In order to reduce such load imposed on the passengers, conventionally, a module has been provided to a portion of an area in which seats are provided on an aircraft, where a closed space is formed by a plurality of side walls enclosing the space from a ceiling to a floor surface, and arranging sofas, tables, playthings and so on within the closed space inside the module, to provide the space, for example, as a room for taking care of infants, a playroom for children, or a lounge for all passengers (refer for example to Patent Literature 1).

CITATION LIST

Patent Literature

[PTL 1] Japanese Translation of PCT International Application Publication No. JP-T-2006-516512

SUMMARY OF INVENTION

Technical Problem

The module taught in Patent Literature 1 is advantageous in that a closed space capable of being used freely is formed within the cabin of an aircraft, but since the space is a closed space, the interior of the space can only be approached through an entrance, such as a door, and the accessibility to the space provided by the module is not sufficient.

Further, since there is a need to attach additional side walls or a module unit within the cabin of the aircraft, it becomes difficult to cut down manufacturing costs and weight of the aircraft.

Therefore, the object of the present invention is to provide an aircraft galley unit that enables to form a space that can be used freely by all passengers with a simple configuration, and having improved accessibility.

Solution to Problem

In order to solve the problems described above, the present invention provides an aircraft galley unit including a floor-side unit which includes a table provided on an upper face of the floor-side unit and a storage section provided in a side portion of the floor-side unit. An entire outer periphery of the floor-side unit is surrounded by aisles.

According to some embodiments of the present invention, the aircraft galley unit includes a ceiling-side unit attached to a ceiling portion above the floor-side unit.

Further, it may include a plurality of columns connecting the ceiling-side unit and the floor-side unit.

Moreover, it may include an isolating portion attached in a manner capable of being expanded or retracted between a side face of the floor-side unit and the ceiling portion or a side face of the ceiling-side unit.

Advantageous Effects of Invention

According to the aircraft galley unit of the present invention, a space that can be used freely by all passengers can be formed with a simple configuration, and the accessibility of the galley unit can be improved.

DESCRIPTION OF EMBODIMENTS

Figure 1:
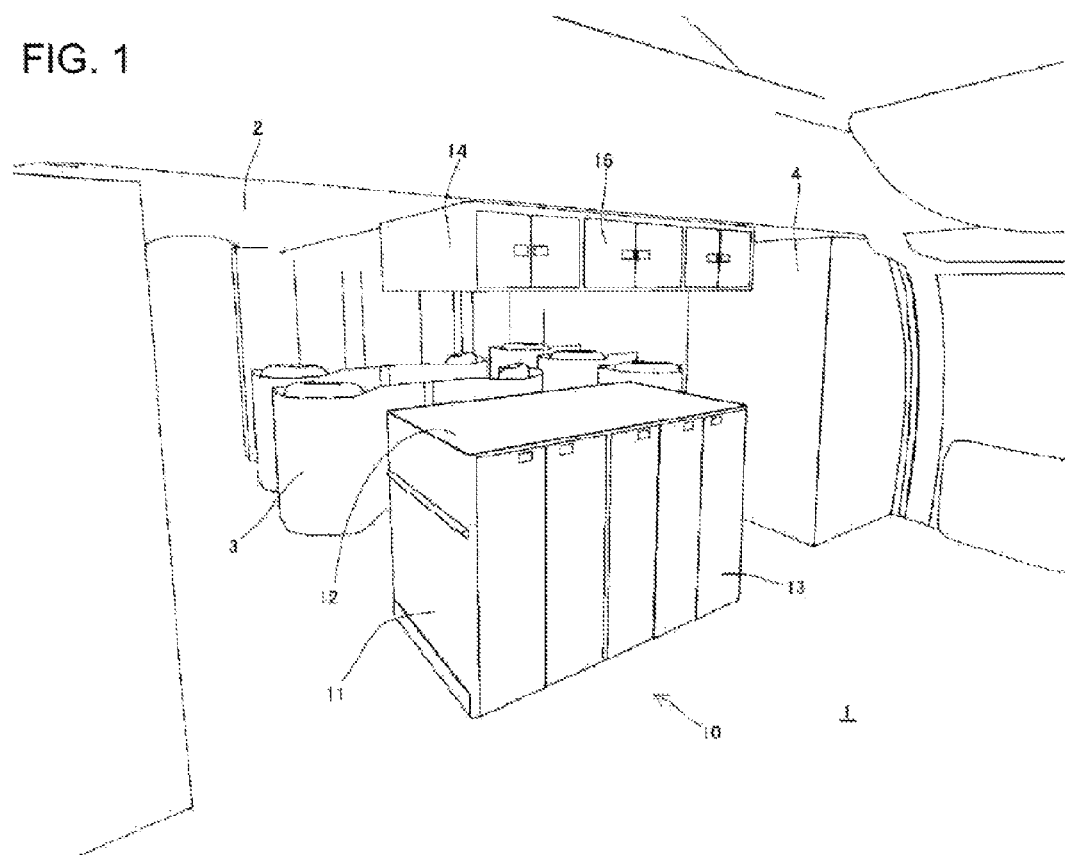
FIG. 1 is a perspective view illustrating an outline of a galley unit installed in an aircraft according to the present invention.

FIG. 1 is a perspective view illustrating an outline of a galley unit installed in an aircraft according to the present invention.

As illustrated in FIG. 1, a galley unit 10 according to the present invention is arranged in an intermediate region on a floor surface 1 in a cabin of an aircraft. Therefore, lavatory units 4 or other facilities are arranged on left and right sides of the galley unit 10 with aisles intervened (seats 3, other galley units, storage units, i.e., closets, bar units and so on can be installed instead of lavatory units 4).

Further, seats 3 or other facilities are arranged in front of and behind the galley unit 10 with aisles intervened.

The galley unit 10 according to the present invention includes a floor-side unit 11. The floor-side unit 11 is a box-shaped structure mounted on the floor surface 1, and the unit 11 includes a table 12 provided on an upper face thereof, and a storage section 13 that can be approached from a side face thereof.

The table 12 is positioned on the upper face of the floor-side unit 11, and has both a function of a worktable on which a crew prepares foods and drinks, and a function of a placing table on which foods and drinks are arranged and placed.

The storage section 13 stores stocks of foods and drinks, carts and so on in the interior thereof. Further, the storage section 13 can store a microwave oven, a coffee maker, a refrigerator, a freezer, a draw-out sink or other units in the interior thereof.

In the galley unit 10 illustrated in FIG. 1, a state is illustrated where doors are provided on the storage section 13 of the floor-side unit 11, but an arrangement can also be adopted where individual storage units with drawers are provided instead of the doors. Further, the arrangements of such doors and drawers can be selected for each area of use.

Moreover, the storage section 13 can be arranged not only on one side of the floor-side unit 11, but arranged on two opposing sides so that they can be approached from both directions.

According to these configurations, the galley unit 10 of the present invention can form a space that can be used freely by passengers with a simple configuration, while improving the accessibility to the galley unit.

Specifically, in the prior art, a closed space has been formed by additionally providing side walls for creating the space that can be used freely by passengers, but the galley unit 10 according to the present invention has the periphery of the galley unit 10 surrounded by aisles, and further has a table 12 provided on the upper face of the floor-side unit 11.

Therefore, a space that can be used freely by passengers in addition to seats is formed by surrounding the galley unit 10 with aisles, instead of installing side wall partitions.

Since the periphery of the galley unit 10 is surrounded by aisles, the passengers can easily approach foods and drinks placed on top of the table 12 of the galley unit 10 from all directions, and the ease of access can be improved.

FIG. 1 illustrates an example where the table 12 is provided on the entire upper face of the floor-side unit, but it is also possible to adopt an arrangement where the table 12 is divided into a few areas and each area is used independently according to the functions.

Such arrangement enables to provide an opening/closing lid, a faucet and a sink on a portion of the table 12, thereby adding the functions of supplying drinking water, washing, and so on.

Moreover, FIG. 1 illustrates an example where a cross-sectional shape of the floor-side unit 11 parallel with the floor surface is a rectangular, but it can also be circular or polygonal.

Psychologically, a person feels cramped when standing side by side on a same side face with another person, but the present configuration enables to increase the side faces (access faces) through which the crews and passengers using the galley unit 10 of the present invention face the unit, so that the number of users simultaneously using the galley unit 10 of the present invention can be increased.

Especially in a case where the galley unit 10 having a circular cross-section is adopted, the effect of improvement of accessibility from 360 degrees becomes more significant, since there is less need to consider the identity of side faces described above.

As illustrated in FIG. 1, a ceiling-side unit 14 attached to a ceiling above the floor-side unit 11 can be additionally provided to the galley unit 10 of the present invention.

The ceiling-side unit 14 is a box-shaped structure attached to a ceiling surface 2, and a storage section 15 is provided therein. The storage section 15 stores relatively light-weight storage objects in the inner side thereof, such as stocks of foods and drinks, trays, and consumables.

According to the galley unit 10 illustrated in FIG. 1, doors are provided on the storage section 15 of the ceiling-side unit 14, but it is also possible to adopt a configuration where storage units with individual drawers are provided instead of the doors, or to adopt a configuration where a lifter is attached to allow the storage unit to be elevated and lowered. Further, the configuration of the doors and drawers can be chosen selectively for each area of use.

Moreover, the storage section 15 can be provided on two opposing sides, for example, instead of on only one side of the ceiling-side unit 14, to allow the storage section to be approached from both sides.

By adopting these configurations, the galley unit 10 according to the present invention enables to store greater amounts of goods and equipment in the entire unit, by providing the storage section 15 in the ceiling-side unit 14 and ensuring more storage space.

If it is merely necessary to ensure an equivalent amount of storage space as the conventional galley unit, the cross-sectional area of the floor-side unit 11 or the ceiling-side unit 14 of the galley unit 10 can be reduced, so that the space capable of being used freely other than the seats can be expanded.

In FIG. 1, the ceiling-side unit 14 is illustrated as a structure whose cross-sectional shape parallel to the floor surface is rectangular, but the cross-sectional shape can also be circular or polygonal. Especially in a case where a structure having a circular cross-section is adopted, the effect of improvement of accessibility from 360 degrees becomes more significant.

Moreover, FIG. 1 illustrates an example where the cross-sectional shapes of the floor-side unit 11 and the ceiling-side unit 14 parallel to the floor surface are the same, but it is also possible to adopt different cross-sectional shapes for the two units. For example, in a case where different cross-sectional shapes are adopted for the floor-side unit 11 and the ceiling-side unit 14, the ceiling surface space and the floor surface space can be utilized independently and effectively, and allowable design of layout can be enhanced.

Further, a unit for illumination and the like for illuminating the table 12 can be mounted to a lower face (face opposed to the floor-side unit 11) of the ceiling-side unit 14.

By adopting such configuration, only the area near the table 12 can be lighted in a passenger aircraft operating at night when the illumination within the cabin is dimmed. Thus, the convenience of the user using the galley unit 10 can be improved without annoying other sleeping passengers.

Figure 2:
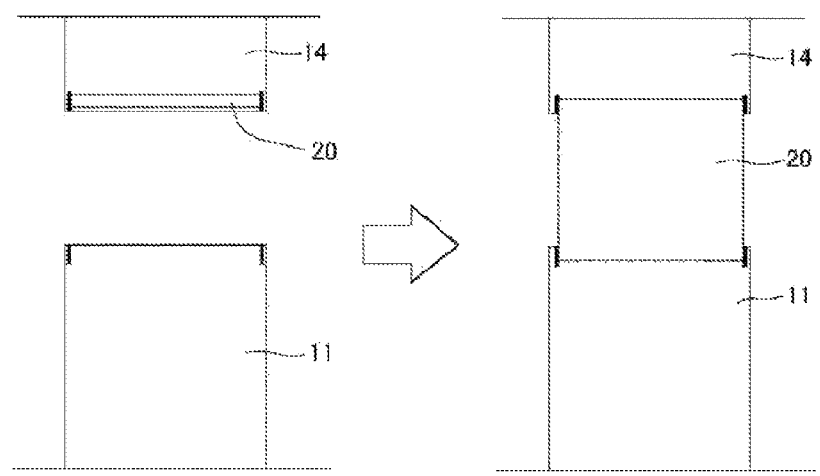
FIG. 2 is a side view illustrating a first modified example of the galley unit according to the present invention.

FIG. 2 is a side view illustrating a first modified example of the galley unit 10 according to the present invention.

As illustrated in FIG. 2, the galley unit 10 according to the present invention has a sheet 20 wound around in a coil shape attached to the side face of the ceiling-side unit 14. Further, a fixing portion to which one end of the sheet 20 is to be fixed is provided on a side face of the floor-side unit 11.

As illustrated on a left side of FIG. 2, the sheet 20 is normally retained in a state where the sheet is wound up, but the one end of the sheet 20 can be pulled out as needed and fixed to the fixing portion on the floor-side unit 11, to thereby form an isolating portion where only the top of the table 12 is isolated from outside.

The sheet 20 can be provided on all side faces of the ceiling-side unit 14, or the side faces where the sheet 20 should be provided and the side faces where the sheet should not be provided can be selected as needed.

According to this configuration, the unit is enabled to be approached from all directions at normal times, but the operation performed on the table 12 can also be isolated from passengers on the outside, for example, while the crew is preparing to serve meals and so on.

Moreover, by forming the sheet 20 from material having a high sound insulating property, the operation that makes some sound performed on the table 12 can be performed without annoying passengers.

Further, by forming the sheet 20 from material having a high light shielding property, the lighting of the table 12 can be blocked from reaching the seats, such as in a case where the passenger aircraft is operated at midnight and the illumination in the cabin is dimmed.

FIG. 2 illustrates an example where the sheet 20 is arranged on the side face of the ceiling-side unit 14, and the fixing portion for fixing one end of the sheet 20 is arranged on the side face of the floor-side unit 11, but the positional relationship between the sheet 20 and the fixing portion can be reversed.

Moreover, FIG. 2 illustrates an example where the ceiling-side unit 14 is provided, but even in a case where the ceiling-side unit 14 is not provided, the sheet 20 and the fixing portion can be arranged between the ceiling surface and the floor-side unit 11 to allow the isolating portion to be formed.

Further, means such as curtain and blind can be adopted instead of the sheet 20 wound around in a coil shape, as long as the isolating portion exerting the above-described effects can be formed.

Figure 3:
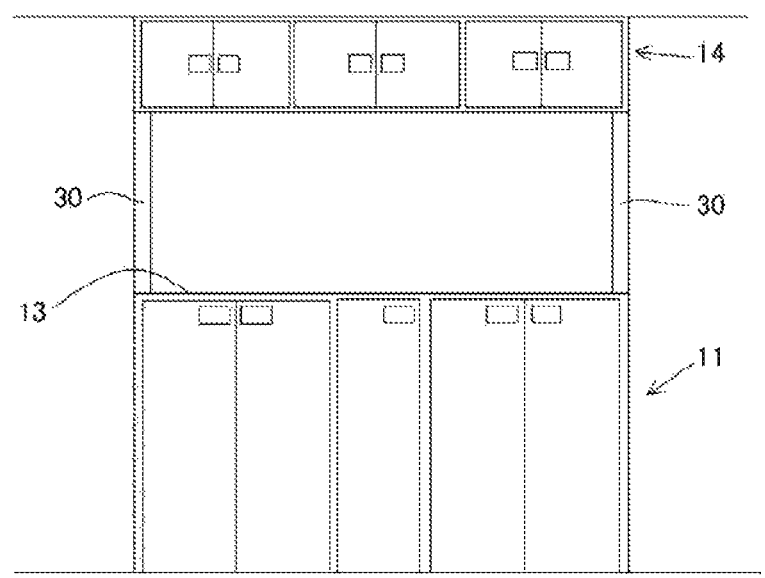
FIG. 3 is a front view illustrating a second modified example of the galley unit according to the present invention.

FIG. 3 is a front view of a second modified example of the galley unit 10 according to the present invention.

As illustrated in FIG. 3, the galley unit 10 according to the present invention has a plurality of columns 30 disposed between the floor-side unit 11 and the ceiling-side unit 14, by which the floor-side unit 11 and the ceiling-side unit 14 are coupled.

The columns 30 are formed of a hollow or solid member having a level of strength and rigidity allowing the columns to stay unbent against load applied from the lateral direction in the drawing. At this time, the cross-sectional shape of the columns 30 can be circular or polygonal, as long as they are provided with the above-described strength and rigidity.

By adopting such configuration, the galley unit can normally be approached from all directions, while the plurality of columns 30 unites the floor-side unit 11 and the ceiling-side unit 14, so that the strength and rigidity of the entire galley unit 10 can be improved.

Further, since the entire galley unit 10 is fixed between the floor surface 1 and the ceiling surface 2 as one component, even if the airframe is vibrated by unfavorable weather during flight, for example, the floor surface unit 11 will not be greatly influenced by the vibration, and objects placed on the table 12 can be prevented from falling and being damaged.

The galley unit according to the present invention is not restricted to the embodiments illustrated above, and can include various modifications.

In addition, regarding a portion of the configurations of the galley unit according to the present invention, some configurations can be added to, deleted from or replaced with other configurations as long as it is within the scope of the technical scope of the present invention.

For example, a configuration can be adopted where a magnet is arranged on a portion of the table, so that metal cans and trays can be attracted and held on the table by magnetic force.

Moreover, a configuration can be adopted where an erected portion (wall portion) is formed on an outer periphery portion of the table, so that objects placed on the table can be prevented from falling from the table.

The galley unit according to the present invention can combine the above-described embodiments and the modified examples.

For example, a configuration can be adopted where the floor-side unit and the ceiling-side unit are coupled by the plurality of columns, and rails are formed on the columns to guide the sheet wound in a coil shape to thereby form the isolating portion.

REFERENCE SIGNS LIST

1 floor surface
2 ceiling surface
10 galley unit
11 floor-side unit
12 table
13 storage section
14 ceiling-side unit
20 sheet
30 column

The invention claimed is:

1. An aircraft galley unit comprising:
a floor-side unit; and
a ceiling-side unit having a storage section,
wherein the floor-side unit comprises:
 a table provided on an upper face of the floor-side unit; and
 a storage section provided in a side portion of the floor-side unit,
wherein an entire outer periphery of the floor-side unit is surrounded by aisles, and
wherein the ceiling-side unit is attached to a ceiling of a cabin of an aircraft vertically above the floor-side unit.

2. An aircraft galley unit comprising:
a floor-side unit;
a ceiling-side unit having a storage section; and
a plurality of columns connecting the ceiling-side unit and the floor-side unit,
wherein the floor-side unit comprises:
 a table provided on an upper face of the floor-side unit; and
 a storage section provided in a side portion of the floor-side unit,
wherein an entire outer periphery of the floor-side unit is surrounded by aisles, and
wherein the ceiling-side unit is attached to a ceiling above the floor-side unit.

3. The aircraft galley unit according to claim 1, further comprising an isolating portion attached in a manner capable of being expanded or retracted between a side face of the floor-side unit and a side face of the ceiling-side unit.

4. The aircraft galley unit according to claim 2, further comprising an isolating portion attached in a manner capable of being expanded or retracted between a side face of the floor-side unit and the ceiling.

* * * * *